A. WITZEL.
RUBBER TIRE.
APPLICATION FILED MAR. 10, 1920.

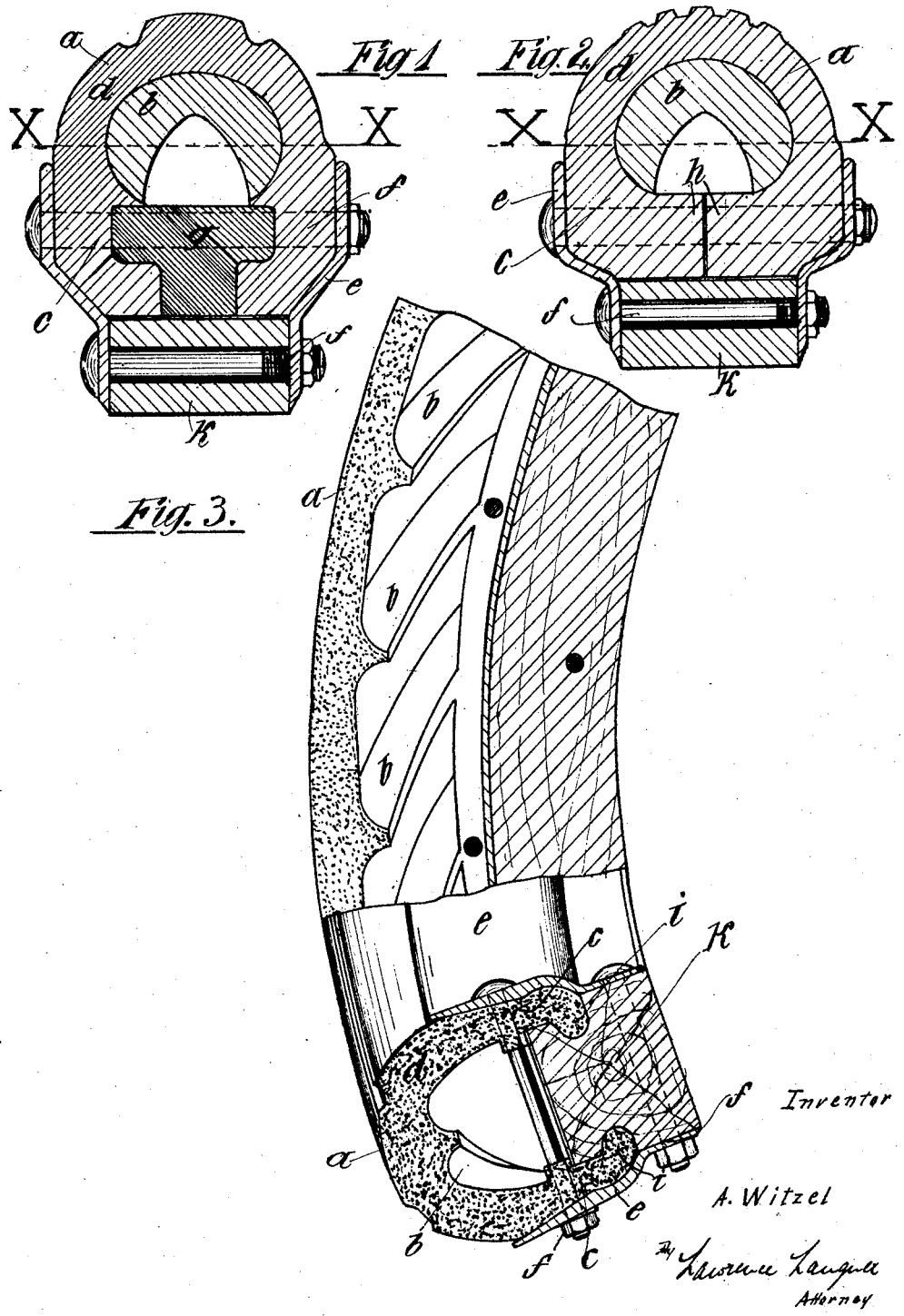

1,419,343.

Patented June 13, 1922.
3 SHEETS—SHEET 2.

Inventor:
A. Witzel
By Lawrence Langner
Attorney

UNITED STATES PATENT OFFICE.

ALBERT WITZEL, OF LUDWIGSBURG, GERMANY.

RUBBER TIRE.

1,419,343. Specification of Letters Patent. Patented June 13, 1922.

Application filed March 10, 1920. Serial No. 364,869.

(GRANTED UNDER THE PROVISIONS OF THE ACT OF MARCH 3, 1921, 41 STAT. L., 1313.)

*To all whom it may concern:*

Be it known that I, ALBERT WITZEL, a citizen of the Free State of Wurttemberg, German Republic, residing at Ludwigsburg, German Republic, have invented certain new and useful Improvements in Rubber Tires, (for which I have filed applications in Germany Jan. 19, 1918, Patent No. 318,715; England Oct. 29, 1919, Patent No. 153,763; Denmark Aug. 12 1919; Norway Aug. 26, 1919; Sweden Aug. 28, 1919, Patent No. 46,792; France Sept. 1, 1919, Patent No. 519,520; Italy Aug. 22, 1919; Spain Aug. 28 1919, Patent No. 70,747; Belgium Sept. 4, 1919; Holland Jan. 13, 1920; Polen Mar. 2, 1920), of which the following is a specification.

This invention relates to a hollow rubber tire for motor cars and similar vehicles which is of the same elasticity as a pneumatic tire, although compressed air is not used, but is without the well known inconveniences of the pneumatic tires.

In order to attain this, transverse vault-shaped strengthening ribs, starting eventually from two sides, are provided upon the inner surface of the mantle, the lower ends of which rest upon the lower part of the tire which is less elastic than the upper-or outer-part of the tire so that the strengthening ribs are well supported. Only the smaller part of the hollow chamber is situated in the outer elastic part of the tire, its principal part being located in the unelastic inner part of the tire. The strengthening ribs are not only compressed under the load but, owing to the novel arrangement and manner of support, bent like elastic rods so that a perfect elasticity is obtained, the complete compression of the hollow chamber being prevented even under the strongest pressure or shocks.

In order to maintain the elastic tire securely upon the rim, a circular rubber ring, which is either made in one piece or composed of several segments, is arranged below the hollow chamber, said ring having shoulders engaging shoulders on the tire and being secured upon the rim through screws. To prevent the tire from creeping on the rim, beads are provided which engage with corresponding grooves of the rim.

In the accompanying drawing the invention is shown by way of example in several different forms of construction.

Figs. 1 and 2 are cross sections showing two different forms of construction.

Fig. 3 is a longitudinal section with end cross section, showing a third form of construction of the improved tire.

The rubber tire $a$ has, in the well known manner, a continuous hollow chamber. The top wall of the chamber is fitted with vault-shaped transverses strengthening ribs $b$ of any convenient position. In the forms of construction shown in Figs. 1 and 2 the ribs $b$ stand at right angles to the tire. According to Fig. 3 they are spiral-shaped; they could however have any other transverse direction and could, for example, stand diagonally at any desired angle or at different angles the one with regard to the other so that they cross one another.

The strengthening ribs or vaults $b$ rest with their ends upon the lower part $c$ of the tire. In order to increase the resistance of the tire, the lower or inner part $c$ of the same is made of less elastic material than the outer part $d$. The part of the hollow chamber, formed by the vault-shaped strengthening ribs $b$, which is situated above a line $x, x, x, x$, and consequently belongs to the elastic part $d$ of the tire, is considerably smaller than the part which is situated below the said line and belongs to the lower part of the tire.

To prevent giving way in lateral direction of the lower part $c$ of the tire $a$ this lower part $c$ is gripped within solid removable flanges $e$ held together by screw bolts $f$.

The circular hollow chamber can either be closed at the bottom or inner end by a ring $g$ (Fig. 1) or by flange-like extensions $h$ of the inner edges of the mantle, which come in contact at the middle (as shown in Fig. 2).

The tire can have beads $i$ on either side designed to fit into circular grooves of the rim $k$ (Fig. 3).

In the forms of construction shown in Figs. 4–9 the ring $g$ serves further for fastening the tire $a$ upon the rim $k$, and to prevent the creeping of the tire upon the rim.

For the first named purpose the ring $g$, which can be continuous or composed of several segments, has lateral shoulders *l* which press upon the edges *h* of the tire *a*. The ring *g* is pressed against the rim *k* by means of a number of screws *m*. Screwed sockets *n* vulcanized into the ring *g* serve for receiving the said screws *m*, said sockets having extensions *o* designed to engage with the lateral shoulders *l* of the ring *g*. In order to still better prevent the creeping the screwed sockets *n* are preferably made to engage with corresponding indentations of the rim *k*, the ring *g* having further at the points where it is fixed lateral flaps *p* designed to engage with corresponding indentations *q* of the tire *a*. To prevent the giving way of the tire *a* in lateral direction, removable side flanges *e'* are provided which grip over beads *i'* of the tire *a*.

Figure 4:
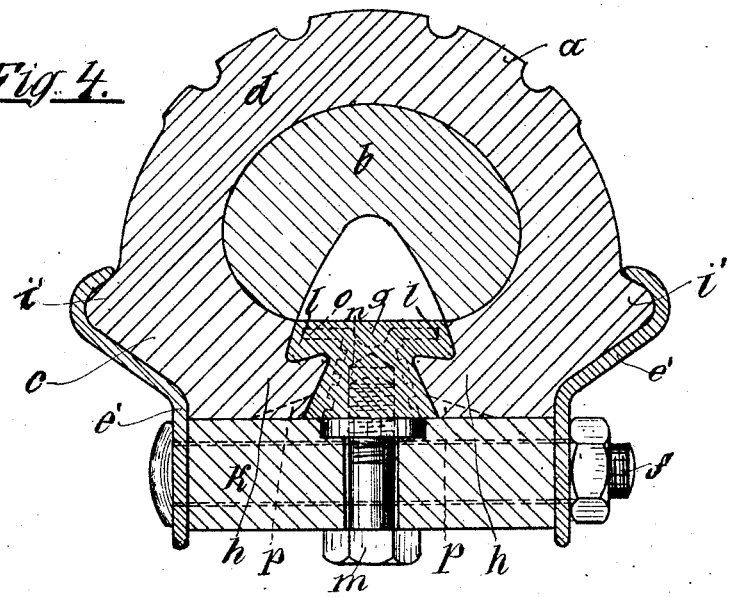
Figs. 4 and 5 are cross sections through a fourth form of construction.
Figure 5:
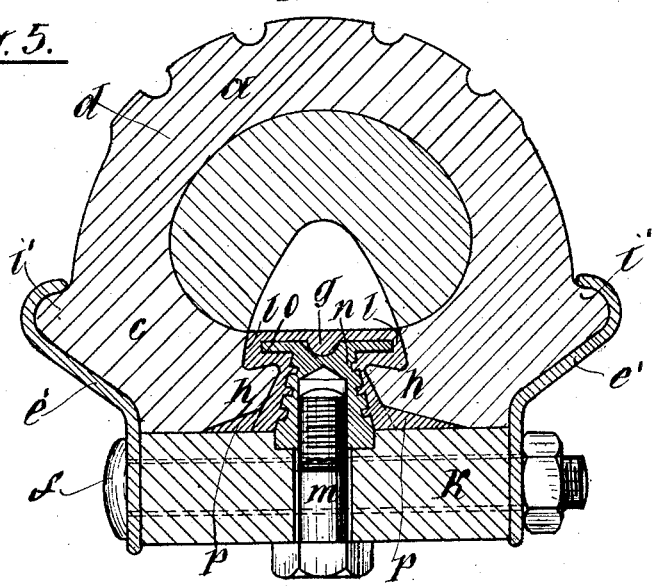
Figure 6:
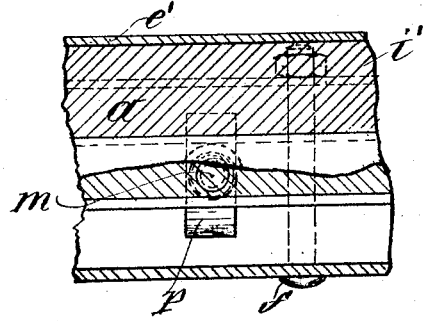
Fig. 6 is a plan view, partly in section, of a point at which the tire is fixed.

According to the forms of construction illustrated in Figs. 4 to 6, the ring *g* is of wedge-shaped cross section, the flaps *p* extending laterally therefrom.

Figure 7:
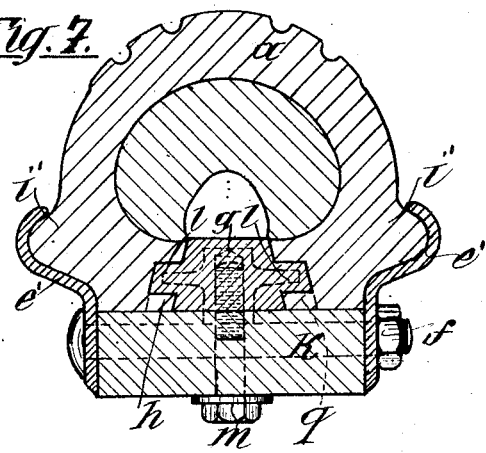
Figs. 7 to 9 are cross sections of two further forms of construction.
Figure 8:
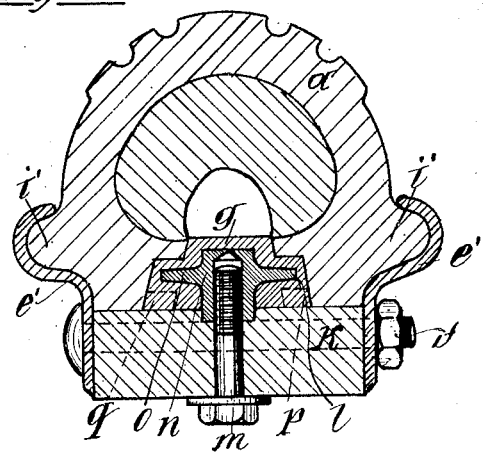

In the form of construction shown in Figs. 7 and 8 the lateral flange-like shoulders *l* of the ring *g* are suppressed and the flaps *p* form strong jaws.

Figure 9:
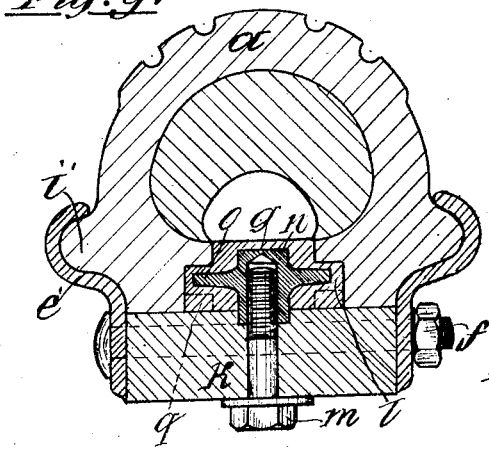

Fig. 9 shows the form of construction in which vertical sides are used.

I claim:—

1. A rubber tire having a central opening therein, a tread portion and a base portion, the former being more resilient than the latter; and transverse strengthening ribs on the internal surface of the tire, said ribs being disposed at an oblique angle relative to the medial plane of the tire, the terminal portions of the ribs resting on the less resilient base portion of the tire.

2. The combination with a rim; of a rubber tire mounted thereon and having a central opening therein, a tread portion and a base portion, the former being more resilient than the latter; transverse strengthening ribs on the internal surface of the tire, said ribs being disposed at an oblique angle relative to the medial plane of the tire, the terminal portions of the ribs resting on the less resilient base portion of the tire; and a ring for maintaining the tire on the rim, said ring having lateral extensions for engaging the side edges of the tire near the base portion thereof.

3. In combination, a rubber tire having a central opening therein, a tread portion and a base portion, the former being more resilient than the latter; transverse strengthening ribs on the internal surface of the tire, said ribs being disposed at an oblique angle relative to the medial plane of the tire, the terminal portions of the ribs resting on the less resilient base portion of the tire; a rim for the tire; and means for preventing creeping of the tire on the rim.

In testimony whereof I affix my signature in presence of two witnesses.

ALBERT WITZEL.

Witnesses:
 ERIKA HALTER,
 MARTHA HANSEL.